(12) United States Patent
Yamamoto et al.

(10) Patent No.: US 7,204,620 B2
(45) Date of Patent: Apr. 17, 2007

(54) HEADLAMP DEVICE WITH SWIVEL CONTROL FOR A VEHICLE

(75) Inventors: Ippei Yamamoto, Shizuoka (JP); Takehiko Tajima, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 177 days.

(21) Appl. No.: 10/979,465

(22) Filed: Nov. 2, 2004

(65) Prior Publication Data

US 2005/0122726 A1 Jun. 9, 2005

(30) Foreign Application Priority Data

Nov. 4, 2003 (JP) .......................... P 2003-374319

(51) Int. Cl.
  *B60Q 1/00* (2006.01)
  *F21V 21/28* (2006.01)
  *F21V 21/29* (2006.01)
(52) U.S. Cl. .................... 362/465; 362/418; 362/512
(58) Field of Classification Search ........ 362/464–466, 362/512–515, 418
See application file for complete search history.

(56) References Cited

U.S. PATENT DOCUMENTS 5,526,242 A * 6/1996 Takahashi et al. .......... 362/466
6,010,237 A * 1/2000 Gotou ........................ 362/460
7,053,762 B2 * 5/2006 Sakai ......................... 340/458
2003/0067762 A1 4/2003 Fukawa

FOREIGN PATENT DOCUMENTS

JP 2003-123514 4/2003

* cited by examiner

*Primary Examiner*—Sandra O'Shea
*Assistant Examiner*—Jason Moon Han
(74) *Attorney, Agent, or Firm*—Fish & Richardson P.C.

(57) ABSTRACT

Front viewability during turning may be enhanced by a headlamp device for a vehicle arranged to perform swivel control. The headlamp device is arranged so that when a vehicle 2 is turning around a right curve with low beam, the vehicle velocity V and the estimated horizontal G value are used to calculate the curve turning radius R, which is then used together with the vehicle velocity R to calculate the driver viewing point angle θ to which the leftward deviation β of the highest light intensity position in the light distribution pattern PL for low beam is added to calculate the target swivel angle α on the basis of which the lighting fixture unit of the headlamp 10R is swung over the target swivel angle α so that light beam is emitted toward a region surrounding the driver viewing point EP on the road ahead of the vehicle in the forward direction. In this arrangement, the driver viewing point angle θ can be calculated using only from the vehicle velocity data as a parameter without using steering angle data, making it possible to simplify the operation for swivel control and to eliminate the need to use a steering angle sensor.

9 Claims, 8 Drawing Sheets

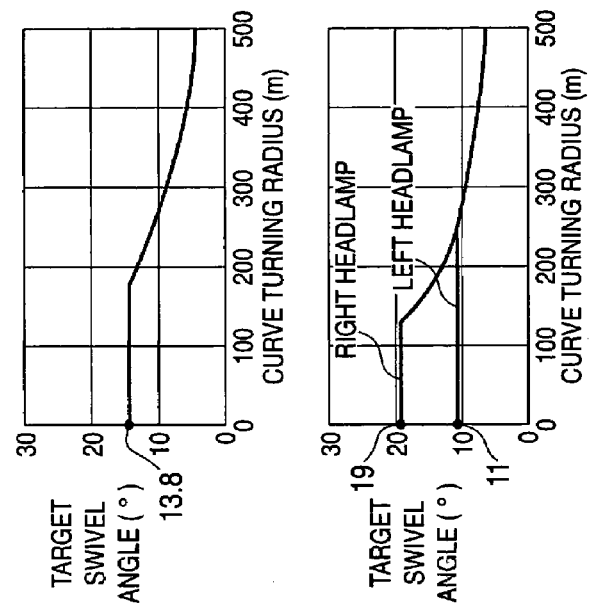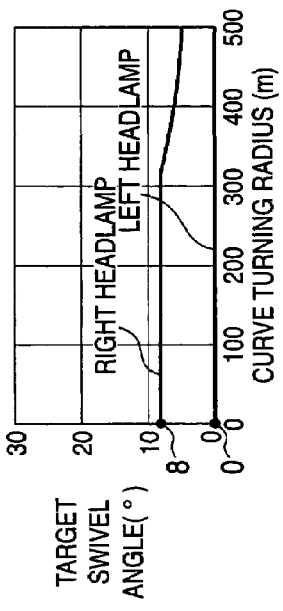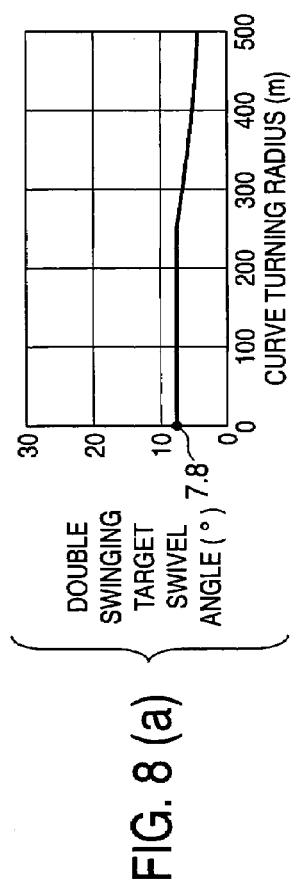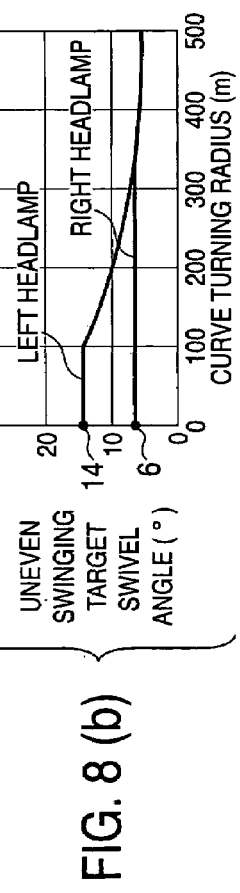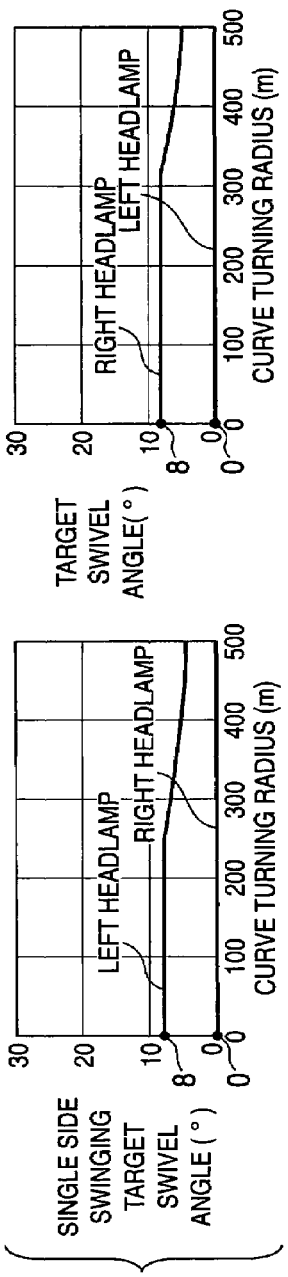
FIG. 8 (a)
FIG. 8 (b)
FIG. 8 (c)

HEADLAMP DEVICE WITH SWIVEL CONTROL FOR A VEHICLE

TECHNICAL FIELD

The present application relates to a headlamp device for vehicle arranged to perform swivel control.

BACKGROUND

Japanese patent document JP-A-2003-123514 discloses a headlamp device for a vehicle comprising a headlamp having a swivel mechanism for swinging the lighting fixture unit from side to side and a drive controlling unit for driving and controlling the swivel mechanism of the lighting fixture unit.

The headlamp device for the vehicle disclosed in the foregoing patent is arranged to cause the drive controlling unit to drive the swivel mechanism according to the velocity of the vehicle and the steering angle so that the lighting fixture unit swings in the turning direction of the vehicle.

When such a swivel control is performed, the light beam can be emitted along the road ahead of the vehicle in the forward direction even while turning, making it possible to enhance the front viewability during turning.

It is desirable for the light beam to be emitted toward the driver viewing point (i.e., the point at which the driver is looking during operation) on the road ahead of the vehicle in the forward direction. However, the driver viewing point may vary with the curve turning radius (i.e., the radius of the running curve around which the vehicle is turning) or the velocity of the vehicle.

Accordingly, the vehicle velocity and the steering angle are used as parameters to calculate the curve turning radius, which is then used with the vehicle velocity to calculate the angle of the direction of the driver viewing point relative to the forward direction of the vehicle (hereinafter referred to as "driver viewing point angle"). The driver viewing point angle is then used to determine the corresponding target swivel angle over which the lighting fixture unit is swung.

Problems may arise because operation of the drive controlling unit becomes difficult. It is also disadvantageous because a vehicle velocity sensor and a steering angle sensor are needed to perform such drive control.

SUMMARY

An aim of the present invention is to provide a headlamp device for a vehicle arranged to perform swivel control which can give enhanced front viewability during turning using a simple arrangement.

The present application can accomplish the aforementioned aim by controlling the drive of a swivel mechanism.

The headlamp device for a vehicle according to the present application may include a head lamp having a lighting fixture unit for emitting a light beam in the forward direction, a swivel mechanism for swinging the lighting fixture unit from side to side, and a drive controlling unit for controlling the drive of the swivel mechanism, wherein the drive controlling unit is arranged to calculate a driver viewing point angle from the vehicle velocity and a predetermined estimated horizontal G value during turning and to predetermine the angle corresponding to the driver viewing point angle as a target swivel angle over which the lighting fixture unit is swung.

The aforementioned "lighting fixture unit" is not limited in its specific configuration so far as it is arranged to emit light beam in the forward direction. The "lighting fixture unit" may be arranged to provide light emission for forming a light distribution pattern for a low beam or a high beam, or may be arranged to selectively provide light emission for forming a light distribution pattern for a low beam and a high beam.

The aforementioned "swivel mechanism" is not limited in its specific configuration so far as it is arranged to tilt the lighting fixture unit from side to side.

The aforementioned "estimated horizontal G value" is not specifically limited.

The aforementioned "target swivel angle" may be the same as or different from the driver viewing point angle so far as it corresponds to the driver viewing point angle.

One or more of the following advantages may be present in various implementations.

The drive controlling unit may be arranged to calculate the driver viewing point angle from the vehicle velocity and a predetermined estimated horizontal G value during turning, and to predetermine the angle corresponding to the driver viewing point angle as the target swivel angle over which the lighting fixture unit is tilted, making it possible to provide the following effects.

A vehicle which is turning is acted on by a centripetal force according to the curve turning radius and the vehicle velocity. Thus, a horizontal G occurs as a centripetal acceleration. The magnitude of the horizontal G that can be generated while the vehicle is normally turning is limited. Accordingly, an appropriate horizontal G value can be predetermined as an estimated horizontal G value. Thus, even when the steering angle of the vehicle is unknown, the curve turning radius can be calculated from the estimated horizontal G value and the vehicle velocity. Furthermore, the driver viewing point angle can be calculated from the curve turning radius and the vehicle velocity. Accordingly, by tilting the lighting fixture unit over the target swivel angle corresponding to the driver viewing point angle, the light beam can be emitted toward the region surrounding the driver viewing point on the road ahead of the vehicle.

During the foregoing procedure, the driver viewing point angle can be calculated using only from the vehicle velocity data as a parameter without using any steering angle date, making it possible to simplify the operation by the drive controlling unit. Furthermore, there is no need to detect the steering angle. Thus, there is no need to use any steering angle sensor.

Thus, in accordance with the present application, a headlamp device for vehicle arranged to perform swivel control can be provided with an enhanced front viewability attained by a simple arrangement.

Furthermore, there is no need to detect the turning state of the vehicle. Instead, the vehicle's turning state can be detected by determining that the steering angle is not smaller than a predetermined value. Thus, a simple sensor may be used for this purpose.

As mentioned above, the estimated horizontal G value in the aforementioned arrangement is not specifically limited. By predetermining the estimated horizontal G value to 0.4 G or less, the following effects may be exerted.

In general, the maximum horizontal G value that can be generated on the vehicle which is turning normally is about 0.4 G. When the horizontal G value exceeds this value, the tires generate a squeal, making it impossible for the vehicle to maintain normal turning. Accordingly, in the case where the estimated horizontal G value is predetermined to 0.4 G, which is the limit of horizontal G value, the calculated curve turning radius is the minimum possible value in the normal turning state. Thus, the target swivel angle is the maximum possible value in the normal turning state. Then, by predetermining the estimated horizontal G value to an appropriate value of 0.4 G or less (e.g., from about 0.2 to 0.3 G), the target swivel angle can be predetermined to a value corresponding to the driver viewing point angle of the vehicle which is actually turning, making it possible to further enhance the front viewability during turning.

Swivel control as performed in the present application may be particularly effective when the vehicle is turning with a low beam, during which the desired front viewability can be difficult to obtain as compared to when the vehicle is turning with a high beam.

With respct to the light distribution pattern for a low beam thus formed, a high light intensity region is normally formed at a position that deviates toward the road edge from the optical axis of the lighting fixture unit. Thus, in order to enhance the front viewability during turning, it is desirable to swing the lighting fixture unit such that the high light intensity region is positioned at the driver viewing point angle.

Then, by predetermining the target swivel angle to be greater than the driver viewing point angle during turning toward the opposite lane and smaller than the driver viewing point angle during turning toward the edge of the road, the lighting fixture unit can be swung such that the high light intensity region is positioned at the driver viewing point angle that the vehicle is turning toward (rightward or leftward), making it possible to further enhance the front viewability during turning.

Four-wheel-driven vehicles, etc. are provided with a pair of headlamps on each respective side thereof. In these applications, swivel control may be provided for both the right and left headlamps of the pair. Alternatively, one of the right and left headlamps of the pair may be provided with swivel control.

In the case where both the right and left headlamps of the pair are provided with swivel control, the target swivel angle may be predetermined to values that are the same as or different from the right headlamp to left headlamp. In the case where the latter arrangement is employed, the following effect can be exerted.

Since the curve turning radius calculated from the estimated horizontal G value and the vehicle velocity is only an approximate value, the target swivel angle, too, is merely a value approximately corresponding to the driver viewing point angle. Thus, by predetermining the target swivel angle to values different from the right headlamp to the left headlamp of the pair, it is also made possible to position the high light intensity region of the light distribution pattern for low beam formed by both the right and left headlamps on both sides of the driver viewing point angle. This arrangement helps assure that the light beam can be emitted toward the region surrounding the driver viewing point angle on the road ahead the vehicle, making it possible to further enhance the front viewability during turning.

In this case, the method for predetermining the target swivel angle to values different from the right headlamp to the left headlamp of the pair is not specifically limited. For example, a method which comprises predetermining the estimated horizontal G value of one of the headlamps of the pair to a larger value and the estimated horizontal G value of the other to a smaller value can be employed. Similarly, a method which comprises predetermining the target swivel angle of one of the headlamps of the pair to a slightly larger value and the target swivel angle of the other to some fraction of that of the former may be employed.

Other features and advantages may be apparent from the following detailed description, the accompanying drawings and the claims.

BRIEF DESCRIPTION OF THE DRAWINGS

FIG. 8 is a graph illustrating a specific example of the aforementioned embodiment wherein the target swivel angle is given an upper limit.

DETAILED DESCRIPTION

Embodiments of implementation of the present application will be described in connection with the accompanying drawings.

Figure 1:
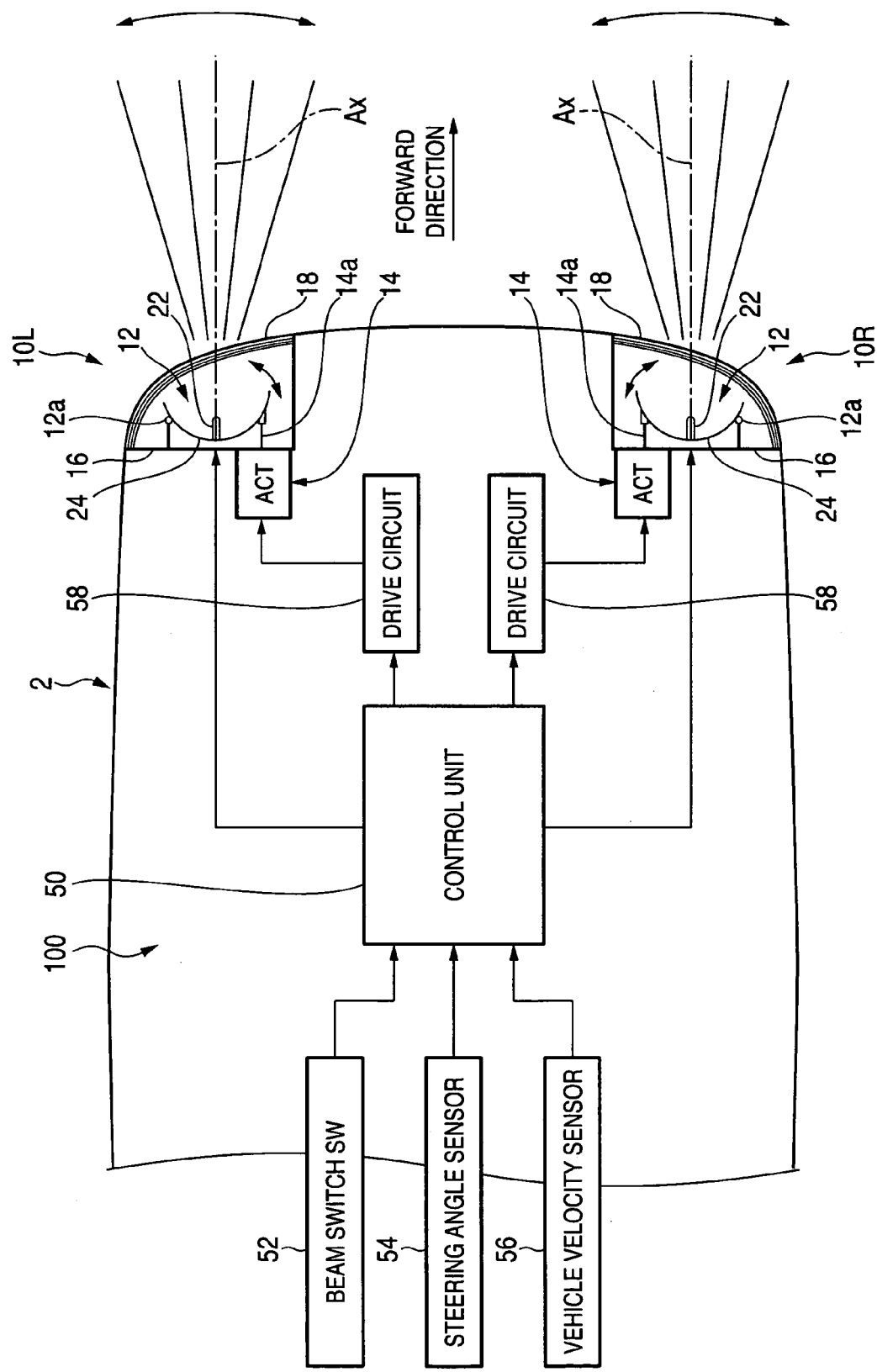
FIG. 1 is a general view illustrating a headlamp device for a vehicle according to an embodiment of the present application.

FIG. 1 is a general view illustrating a plan of a headlamp device for a vehicle according to an embodiment of the present application.

As shown in FIG. 1, the headlamp device for vehicle 100 according to the present embodiment comprises a pair of headlamps 10L, 10R provided on both the left and right sides of the front end of a vehicle 2, respectively, and a control unit 50 for controlling the headlamps 10L, 10R.

The headlamps 10L, 10R each comprise a lighting fixture unit 12 for emitting a light beam in the forward direction and a swivel mechanism 14 for swinging the lighting fixture unit 12 from side to side.

The lighting fixture unit 12 is a parabolic lighting fixture unit having an optical axis (Ax) extending in the longitudinal direction. The lighting fixture unit 12 is supported in such an arrangement so that it can swing from side to side with respect to a lamp body 16 while being received in a lighting chamber defined by the lamp body 16 and an unfrosted transparent cover 18. The lighting fixture unit 12 comprises a light source bulb 22 made of a H4 halogen bulb and a reflector 24 for providing diffused deflected reflection of the light beam from the light source bulb 22 in the forward direction and is arranged to provide light emission for forming a light distribution pattern for a low beam or a light distribution pattern for a high beam.

Figure 2:
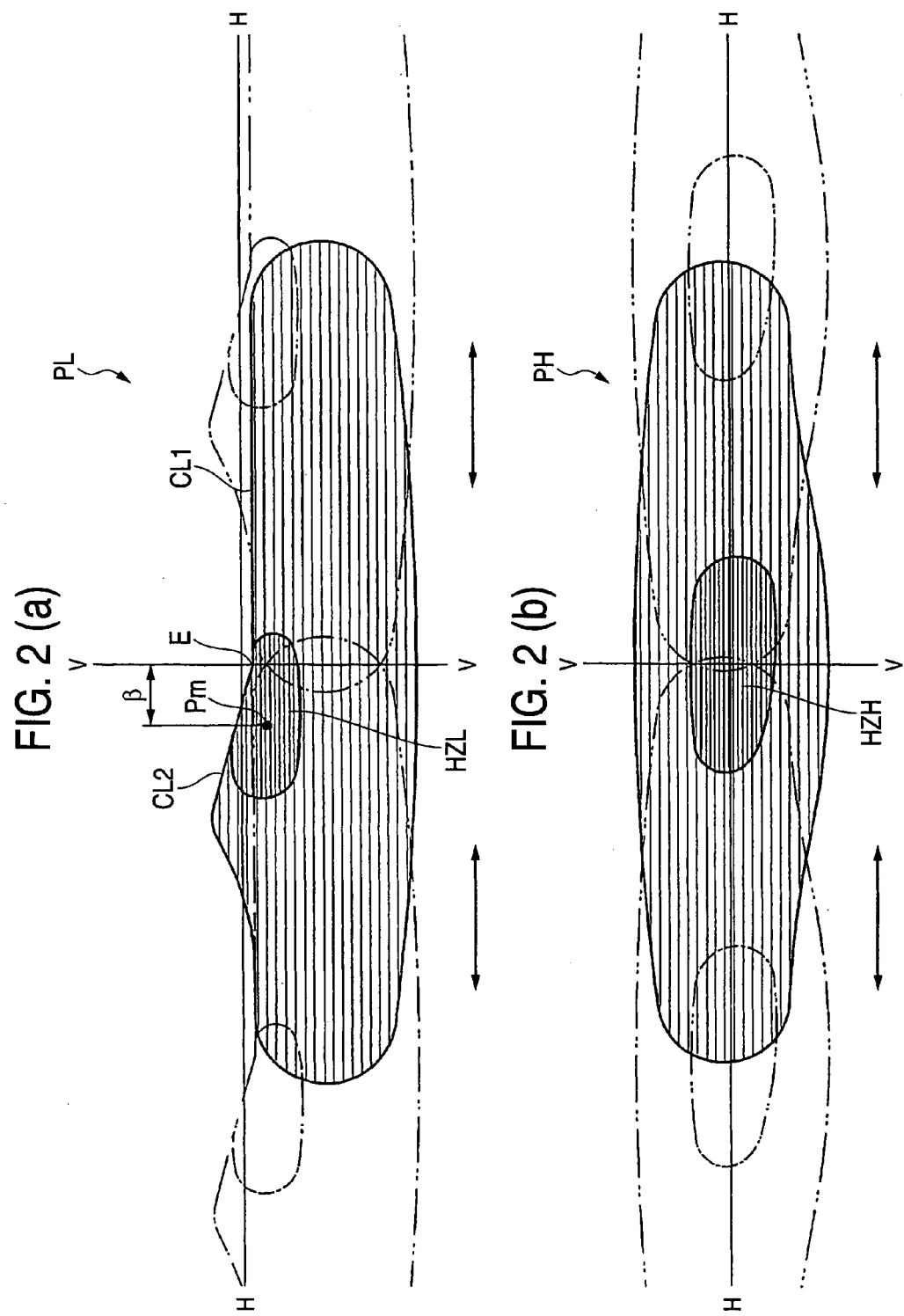
FIG. 2 is a diagram illustrating the light distribution pattern formed by a light beam emitted in the forward direction by the lighting fixture unit constituting the aforementioned headlamp device for a vehicle on an imaginary vertical screen disposed at the position 25 meters ahead the lighting fixture unit wherein FIG. 2A indicates the light distribution pattern for a low beam and FIG. 2B indicates the light distribution pattern for a high beam.

FIG. 2 is a diagram illustrating the light distribution pattern formed by a light beam emitted in the forward direction by the lighting fixture unit 12 on an imaginary vertical screen disposed at the position twenty-five meters a head of the lighting fixture unit 12, wherein FIG. 2A indicates the light distribution pattern for a low beam, and FIG. 2B indicates the light distribution pattern for a high beam.

The light distribution pattern PL for the low beam shown in FIG. 2A is a left-oriented light distribution pattern formed by lighting a filament for a low beam of the light source bulb 22. The light distribution pattern PL has a horizontal cut-off line CL1 and an oblique cut-off line CL2 rising from the horizontal cut-off line CL1 at an angle of 15° on the upper edge thereof. The position of an elbow point E—which is a point of intersection of the two cut-off lines CL1, CL2—is predetermined to be from about 0.5 to 0.6° below H-V, which is the vanishing point ahead the lighting fixture unit. In this light distribution pattern PL for the low beam, a hot zone HZL, which is a high light intensity region, surrounds the elbow point E. The leftward deviation β of the highest light intensity point Pm in the hot zone HZL is predetermined to about 3°.

On the other hand, the light distribution pattern PH for the high beam shown in FIG. 2B is a light distribution pattern formed by lighting a filament for high beam of the light source bulb 22. The light distribution pattern PH extends horizontally with H-V as a center. A hot zone HZH is formed in a region surrounding H-V.

As shown in FIG. 1, the swivel mechanism 14 includes an actuator such as a stepping motor, DC motor or the like, attached to the lamp body 16, and is connected to the crosswise inner end of the lighting fixture unit 12 at the forward end of the output shaft 14a thereof. The swivel mechanism 14 is arranged to swing the lighting fixture unit 12 from side to side with the support 12a on the crosswise outer end thereof as center by moving the output shaft 14a back and forth. In this arrangement, the light distribution pattern PL for the low beam or the light distribution pattern PH for the high beam can be moved from side to side as shown by the chain double-dashed line in FIG. 2, with the position shown by the solid line in FIG. 2 as a reference.

As shown in FIG. 1, the control unit 50 is arranged to receive signals from a beam switch 52, a steering angle sensor 54 and a vehicle velocity sensor 56.

The beam switch 52 is adapted to switch over from a low beam to a high beam, or vice versa. The steering angle sensor 54 is adapted to detect that the vehicle is in a turning state. The steering angle sensor 54 is arranged to detect that the vehicle is in a left turning state or a right turning state when the steering (leftward or rightward) is at an angle of at least a predetermined value (e.g., 5° or more).

The control unit 50 is arranged to switch the beam from the headlamps 10L, 10R on the basis of input signals from the beam switch 52 and drive the swivel mechanism 14 of the headlamps 10L, 10R through a drive circuit 58 on the basis of input signals from the steering angle sensor 54 and the vehicle velocity sensor 56 to swing the lighting fixture unit 12 of the headlamps 10L, 10R from side to side.

Swivel control of the headlamps 10L, 10R by the control unit 50 is performed as follows.

A predetermined estimated horizontal G value and a leftward deviation β of the highest light intensity position Pm in the light distribution pattern PK for low beam are previously stored in the control unit 50. During turning, the control unit 50 calculates the target swivel angle α from the estimated horizontal G value a, the leftward deviation β and the vehicle velocity V, and then swings the lighting fixture unit 12 of the headlamps 10L, 10R over the target swivel angle α on the basis of the results of the calculation.

The estimated horizontal G value a is predetermined to 0.25 G in the present embodiment. The reason why the estimated horizontal G value a is predetermined to 0.25 G is that the average horizontal G value of a vehicle which is normally turning is about 0.25 G. That estimated horizontal G value makes it possible to make the target swivel angle α correspond to the actual turning conditions as much as possible.

The swivel control is conducted for the right headlamp 10R during right curve turning and for the right headlamp 10L during right curve turning. The swivel control is not conducted for the left headlamp 10L during right curve turning, and is not conducted for the right headlamp 10R during left curve turning. One of the pair of right and left headlamps is arranged to keep the lighting fixture unit 12 facing forward, making it possible to assure front viewability even during turning.

The swivel control over the headlamps 10L, 10R by the control unit 50 will be further described in connection with FIGS. 3 and 4.

Figure 3:
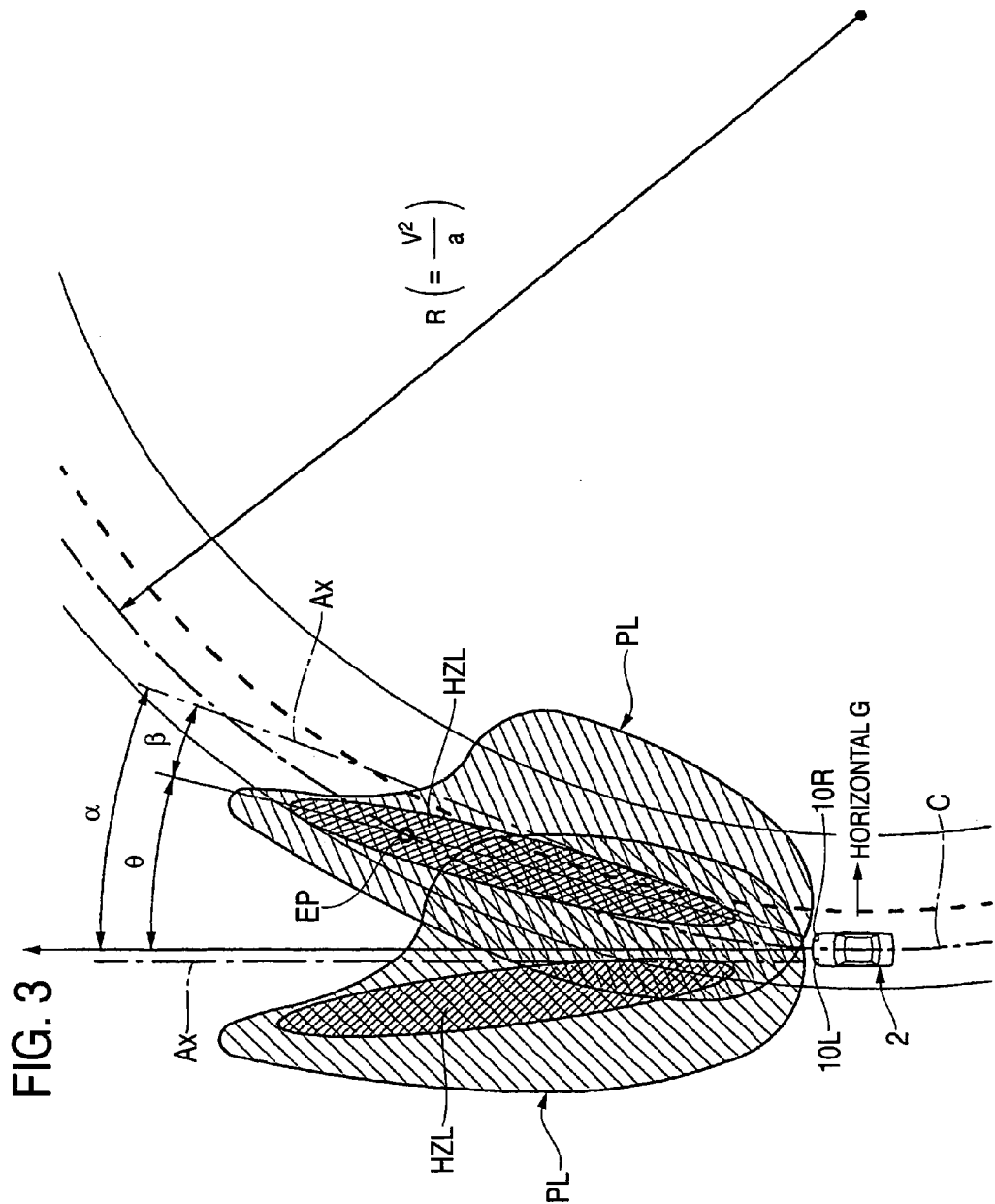
FIG. 3 is a plan view illustrating two low beam light distribution patterns PL formed on the road ahead of the vehicle by a light beam emitted by a pair of left and right headlamps while the vehicle is turning around a right curve with a low beam together with the vehicle.
Figure 4:
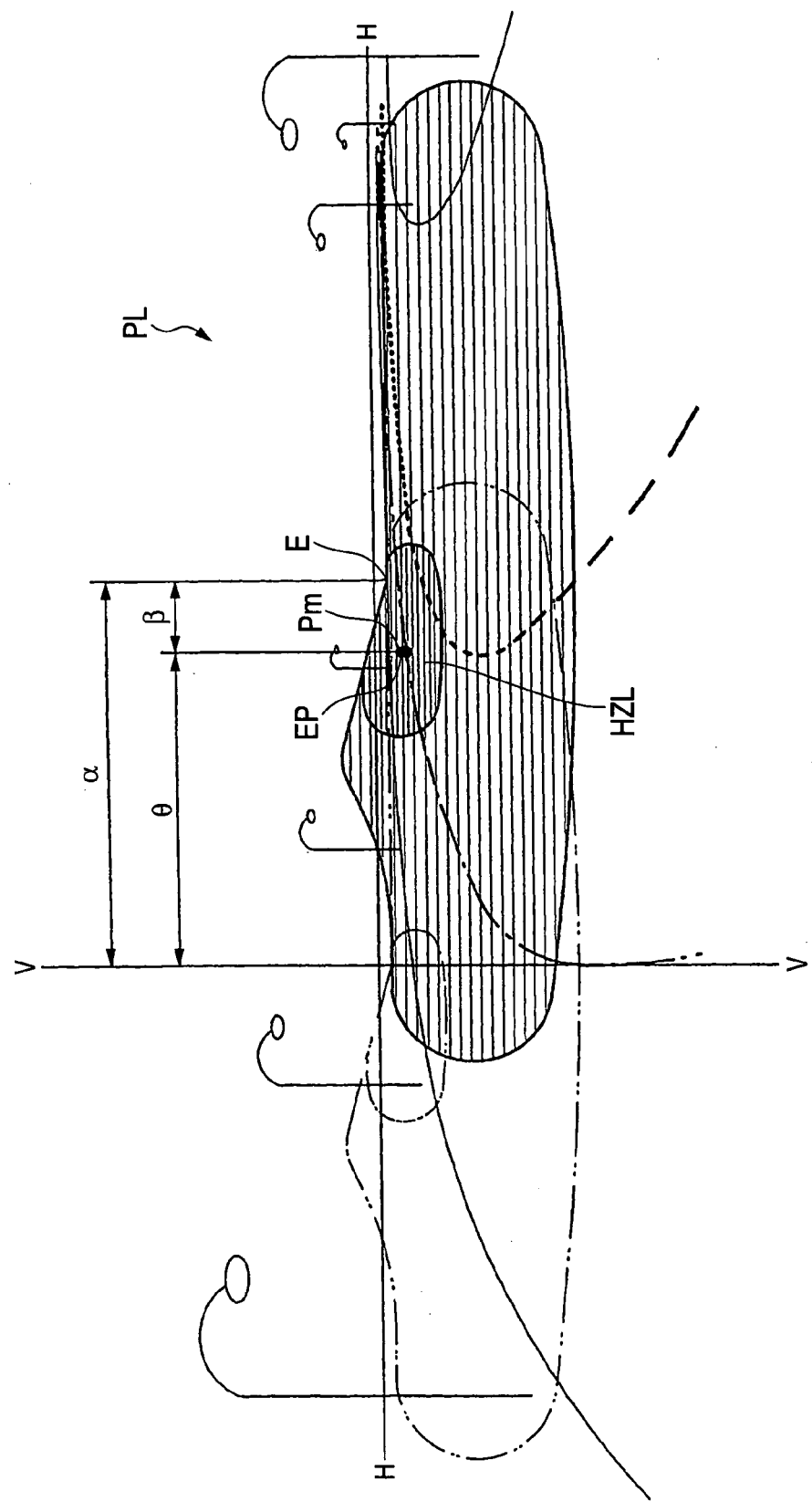
FIG. 4 is a perspective view of the low beam light distribution pattern PL formed on the aforementioned imaginary vertical screen by a light beam emitted by the right headlamp while the vehicle is turning around a right curve with a low beam.

FIG. 3 is a plan view illustrating two low beam light distribution patterns PL formed on the road ahead of a vehicle 2 by a light beam emitted by a pair of left and right headlamps 10L, 10R while the vehicle 2 is turning around a right curve together with the vehicle 2. FIG. 4 is a perspective view of the low beam light distribution pattern PL formed on the aforementioned imaginary vertical screen by light beam emitted by the right headlamp 10R.

The control unit 50 is arranged to calculate the turning radius R of the curve from the vehicle velocity V and the estimated horizontal G value a, to calculate the driver viewing point angle θ from the curve turning radius R and the vehicle velocity V, to add the leftward deviation β as an angle correction to the driver viewing point angle θ to calculate the target swivel angle α and then to drive the swivel mechanism 14 so that the lighting fixture unit 12 of the right headlamp/OR is swung over the target swivel angle α. The driver viewing point angle θ is the angle of the direction of the driver viewing point EP relative to the forward direction of the vehicle as defined above. In this case, the driver viewing point EP is predetermined to be the point the vehicle 2 reaches after three seconds on the running curve C.

This swivel control causes the low beam light distribution pattern PL formed by the light beam emitted by the right headlamp 10R to be provided on the road ahead of the vehicle in the turning direction and the hot zone HZL to be formed in a region surrounding the driver viewing point EP. On the other hand, the low beam light distribution pattern PL—formed by the light beam emitted by the left headlamp 10L—is provided on the road ahead of the vehicle in the forward direction.

In this arrangement, when the vehicle 2 is turning around a right curve with a low beam, the road can be sufficiently illuminated ahead of the vehicle both in the turning direction and in the forward direction, making it possible to enhance viewability.

Figure 5:
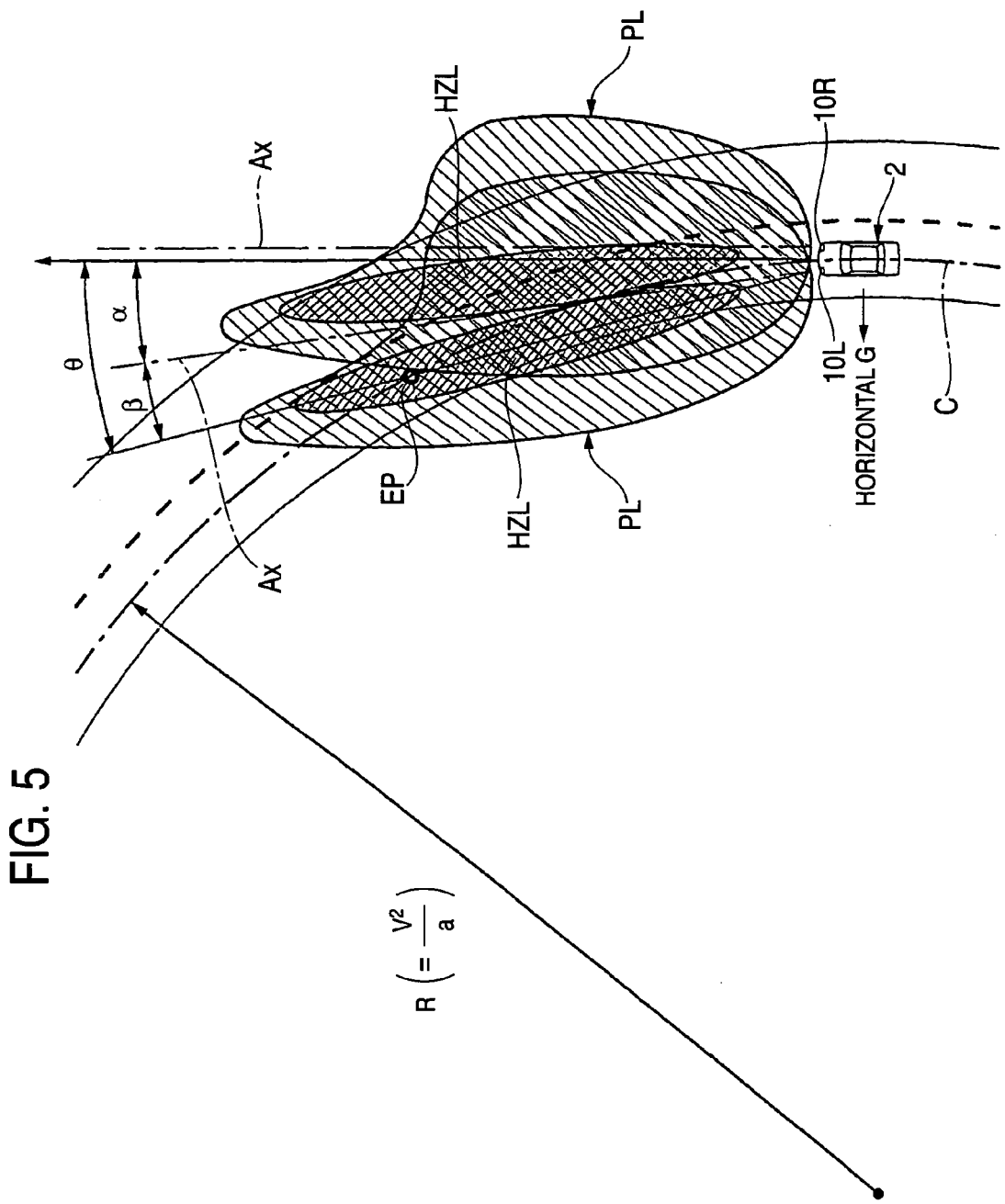
FIG. 5 is a plan view illustrating two low beam light distribution patterns PL formed on the road ahead of the vehicle by a light beam emitted by a pair of left and right headlamps while the vehicle is turning around a left curve with a low beam together with the vehicle.

FIG. 5 is a plan view illustrating two low beam light distribution patterns PL formed on the road ahead of the vehicle 2 by a light beam emitted by a pair of left and right headlamps 10L, 10R while the vehicle 2 is turning around a left curve together with the vehicle 2.

As shown in FIG. 5, the details of the swivel control for the left headlamp 10L by the control unit 50 are the same as that for the right headlamp 10R during right curve turning, but are different from that for the right headlamp 10R during right curve turning in that the target swivel angle α is calculated by subtracting the leftward deviation β as an angle correction from the driver viewing point angle θ.

During left curve turning, the low beam light distribution pattern PL formed by the light beam emitted by the left headlamp 10L is formed on the road ahead of the vehicle 2 in the turning direction, and the hot zone HZL is formed in a region surrounding the driver viewing point EP. On the other hand, the low beam light distribution pattern PL formed by the light beam emitted by the right headlamp 10R is formed on the road ahead of the vehicle in the forward direction.

In this arrangement, when the vehicle 2 is turning around a left curve with low beam, the road can be sufficiently illuminated ahead of the vehicle both in the turning direction and in the forward direction, making it possible to enhance viewability.

In the present embodiment, swivel control can be performed in the same manner regardless of whether the vehicle 2 is turning with a low beam or with a high beam. In this manner, regardless of whether the vehicle 2 is turning leftward or rightward with a high beam, the road can be sufficiently illuminated ahead of the vehicle both in the turning direction and in the forward direction, making it possible to enhance viewability.

As explained above, the headlamp device for a vehicle 100 according to the present embodiment causes the control unit 50 to calculate the curve turning radius R from the vehicle velocity V and the estimated horizontal G value a, to calculate the driver viewing point angle θ from the curve turning radius R and the vehicle velocity V and then to add the leftward deviation β of the highest light intensity position Pm in the low beam light distribution pattern PL as an angle correction to or subtract it from the driver viewing point angle θ to calculate the target swivel angle α during turning. On the basis of the results of the calculation, the swivel mechanism 14 is driven to swing the lighting fixture unit 12 over the target swivel angle α, making it possible to emit the light beam toward a region surrounding the driver viewing point EP on the road ahead of the vehicle in the forward direction.

During this procedure, the driver viewing point angle θ can be calculated only from the vehicle velocity as a parameter without using steering angle data, making it possible to simplify the operation of the control unit 50. Furthermore, there is no need to detect the steering angle and hence no need to use any steering angle sensor. Accordingly, a simple arrangement can be employed to enhance the front viewability during turning.

In the present embodiment, the turning state of the vehicle 2 needs to be detected. Use of the steering angle sensor 54 makes it easy to detect the turning state of the vehicle 2 by a simple arrangement.

In the present embodiment, the estimated horizontal G value is predetermined to 0.25 G, which is the average horizontal G value developed on the vehicle which is turning normally. Accordingly, the target swivel angle α can be predetermined to a value corresponding to the driver viewing point angle θ of the vehicle 2 which is actually making a normal turn, making it possible to further enhance the front viewability during turning.

Further, in the present embodiment, the target swivel angle α of the right headlamp 10R during right curve turning is predetermined to the leftward deviation β of the highest light intensity position Pm in the low beam light distribution pattern PL higher than the driver viewing point angle θ while the target swivel angle α of the left headlamp 10L during left curve turning is predetermined to the leftward deviation β lower than the driver viewing point angle θ. In this arrangement, regardless of whether the vehicle is turning leftward or rightward, the hot zone HZL of the low beam light distribution pattern PL can be formed in a region surrounding the driver viewing point EP on the road ahead of the vehicle in the turning direction, making it possible to further enhance the front viewability during turning.

In the present embodiment, swivel control over the right headlamp 10R is made only during right curve turning, whereas swivel control over the left headlamp 10L is made only during left curve turning, but the swivel control is not performed for the left headlamp 10L during right curve turning and for the right headlamp 10R during left curve turning. In this arrangement, one of the pair of left and right headlamps 10L, 10R is arranged to keep the lighting fixture unit 12 facing forward, making it possible to assure front viewability even during turning.

A modification of the foregoing embodiment is described below.

Figure 6:
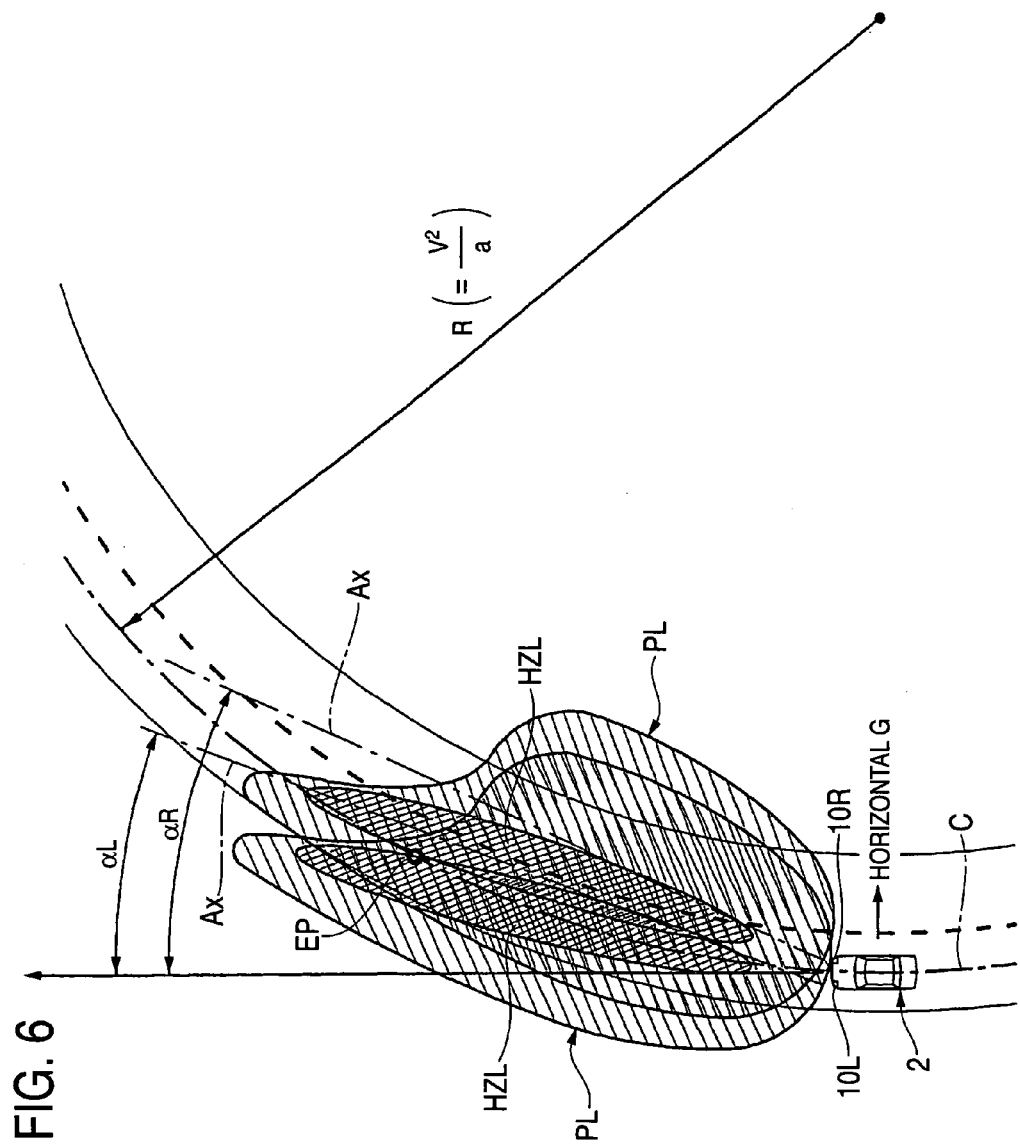
FIG. 6 is a diagram similar to FIG. 3 indicating a modification of the aforementioned embodiment.
Figure 7:
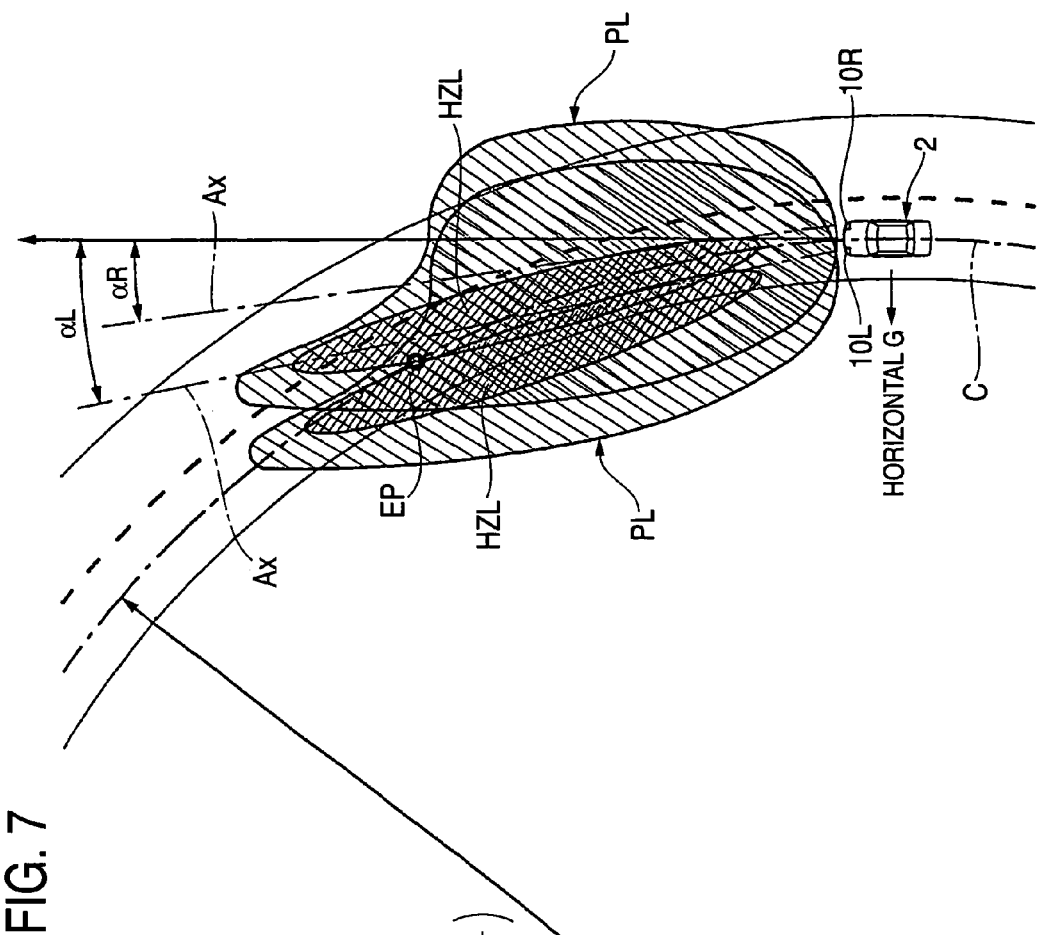
FIG. 7 is a diagram similar to FIG. 5 indicating the configuration of the aforementioned modification.

FIGS. 6 and 7 are diagrams similar to FIGS. 3 and 5 indicating the configuration of the present modification.

As shown in FIGS. 6 and 7, the present modification is arranged to make swivel control for both the pair of left and right headlamps 10L, 10R when the vehicle is turning leftward or rightward. In the present modification, the target swivel angle is predetermined to different values for the left headlamp 10L and the right headlamp 10R.

The estimated horizontal G value a for the right headlamp 10R is predetermined to a value greater than 0.25 G (e.g., 0.3 G), and the estimated horizontal G value a for the left headlamp 10L is predetermined to a value smaller than 0.25 G (e.g., 0.2 G) during right curve turning. In this arrangement, as shown in FIG. 6, the target swivel angle αR of the right headlamp 10R is predetermined to a value greater than the target swivel angle α of the aforementioned embodiment, whereas the target swivel angle αL of the left headlamp 10L is predetermined to a value smaller than the target swivel angle α of the aforementioned embodiment.

The estimated horizontal G value a for the left headlamp 10L is predetermined to a value greater than 0.25 G (e.g., 0.3 G), and the estimated horizontal G value a for the right headlamp 10R is predetermined to a value smaller than 0.25 G (e.g., 0.2 G) during left curve turning. In this arrangement, as shown in FIG. 7, the target swivel angle αL of the left headlamp 10L is predetermined to a value greater than the target swivel angle α of the aforementioned embodiment while the target swivel angle αR of the right headlamp 10R is predetermined to a value smaller than the target swivel angle α of the aforementioned embodiment.

The employment of the present embodiment makes it possible to exert the following effects.

In the foregoing embodiment, since the curve turning radius R calculated from the vehicle velocity V and the estimated horizontal G value a is an approximate value, the target swivel angle α, too, is a value approximately corresponding to the driver viewing point angle θ. Then, as in the present embodiment, when the estimated horizontal G value a is predetermined to different values for the left headlamp 10L and the right headlamp 10R of the pair so that the target swivel angles αL, αR are predetermined to a value greater and smaller than the target swivel angle α of the previous embodiment corresponding to the driver viewing point angle θ, respectively, it is assured that the light beam can be emitted toward a region surrounding the driver viewing point EP on the road ahead of the vehicle in the forward direction, making it possible to further enhance the front viewability during turning.

In the aforementioned embodiment and its modification, the angle at which the lighting fixture unit 12 can swing from side to side when driven by the swivel mechanism 14 is limited. Thus, it is desirable that the aforementioned target swivel angles α, αL and αL be given upper limits.

FIG. 8 is a graph illustrating a specific example of the case where the target swivel angles are given upper limits.

FIG. 8A indicates the upper limit of the target swivel angle during double swinging (i.e., swinging of the pair of left and right headlamps 10L, 10R over the same target swivel angle).

During the double swinging, as the curve turning radius decreases, the target swivel angle increases. The percent increase of target swivel angle is predetermined to be larger during right curve turning than during left curve turning. For example, the upper limit of the target swivel angle during right curve turning may be predetermined to be 13.8°, whereas the upper limit of the target swivel angle during left curve turning is predetermined to be 7.8°.

FIG. 8B indicates the upper limit of the target swivel angle during uneven swinging (i.e., during swinging of the pair of left and right headlamps 10L, 10R over different target swivel angles).

During the uneven double swinging, as the curve turning radius decreases, the target swivel angle increases. The percent increase of target swivel angle is predetermined to be larger during right curve turning than during left curve turning. For example, the upper limit of the target swivel angle during right curve turning may be predetermined to 19° for the right headlamp 10R and 11° for the left headlamp 10L, and the upper limit of the target swivel angle during left curve turning may be predetermined to be 14° for the left headlamp 10L and 6° for the right headlamp 10R.

FIG. 8C indicates the upper limit of the target swivel angle during single side swinging (i.e., during swinging of only one of the pair of left and right headlamps 10L, 10R).

During the single side swinging, too, as the curve turning radius decreases, the target swivel angle increases. The percent increase of target swivel angle is predetermined to be larger during right curve turning than during left curve turning. The upper limit of the target swivel angle may be predetermined to 8° both for the right headlamp 10R which swings during right curve turning and the left headlamp 10L which swings during left curve turning.

In the specific embodiment shown in FIG. 8, during the uneven double swinging, when the curve turning radius R decreases somewhat, the target swivel angles of the pair of headlamps 10L, 10R are different from each other. During the single side swinging, the target swivel angle of the pair of left and right headlamps 10L, 10R are always different from each other. However, because the maximum difference in target swivel angle between the left and right headlamps 10L, 10R is 8° when the target swivel angle of one of the two headlamps reaches upper limit, the hot zone HZL in the low beam light distribution pattern PL formed by the right headlamp 10R and the hot zone HZL in the low beam light distribution pattern PL formed by the left headlamp 10L can be prevented from being drastically separated horizontally from each other. In this arrangement, the occurrence of uneven light distribution on the road ahead of the vehicle in the forward direction can be effectively inhibited, making it possible to enhance the front viewability during turning.

While the aforementioned embodiment and its modification have been described with reference to the case where the lighting fixture unit 12 of the headlamps 10L, 10R is in the form of a parabolic lighting fixture unit capable of switching over a low beam to a high beam, and vice versa, the lighting fixture unit 12 may be dedicated for wither a low beam or high beam. Alternatively, the lighting fixture unit may be other than a parabolic lighting fixture unit (e.g., a projector-like lighting fixture unit).

What is claimed is:

1. A headlamp device for a vehicle comprising
a headlamp having a light fixture unit for emitting a light beam in the forward direction,
a swivel mechanism for swinging the lighting fixture unit from side to side, and
a drive controlling unit for controlling the drive of the swivel mechanism,
wherein the drive controlling unit is arranged to calculate a driver viewing point angle from the vehicle velocity and a predetermined estimated horizontal G value during turning, wherein the predetermined estimated horizontal G value corresponds to a predetermined centripetal acceleration, and to calculate a target swivel angle over which the lighting fixture unit is swung based on an angle correction to the driver viewing point angle.

2. The headlamp device for a vehicle as defined in claim 1, wherein the estimated horizontal G value is predetermined to be 0.4 G or less of a maximum horizontal G value.

3. The headlamp device for a vehicle as defined in claim 1, wherein the target swivel angle is predetermined to be greater than the driver viewing point angle during turning toward an opposite lane but smaller than the driver viewing point angle during turning toward a road edge.

4. The headlamp device for a vehicle as defined in claim 1, wherein a pair of headlamps is provided on a respective side of the vehicle, and the target swivel angle is predetermined to different values for each headlamp of the pair.

5. The headlamp device for a vehicle as defined in claim 1, wherein the driver viewing point angle is calculated from a curve turning radius and the vehicle velocity, the curve turning radius being calculated from the vehicle velocity and the estimated horizontal G value.

6. The headlamp device for a vehicle as defined in claim 1, wherein the target swivel angle is calculated by adding a deviation of a highest light intensity position in a low beam light distribution pattern as an angle correction to the driver viewing point angle or by subtracting the angle correction from the driver viewing point angle.

7. The headlamp N device for a vehicle as defined in claim 4, wherein the maximum value of a difference in target swivel angle between the pair of headlamps is predetermined.

8. A headlamp device for a vehicle comprising
a headlamp having a light fixture unit for emitting a light beam in the forward direction,
a swivel mechanism for swinging the lighting fixture unit from side to side, and
a drive controlling unit for controlling the drive of the swivel mechanism, wherein the drive controlling unit is arranged to calculate a driver viewing point angle from the vehicle velocity and a predetermined estimated horizontal G value during turning, wherein the predetermined estimated horizontal G value corresponds to a predetermined centripetal acceleration, and to set the angle corresponding to the driver viewing point angle as a target swivel angle over which the lighting fixture unit is swung, and further wherein the target swivel angle is predetermined to be greater than the driver viewing point angle during turning toward an opposite lane but smaller than the driver viewing point angle during turning toward a road edge.

9. A headlamp device for a vehicle comprising a headlamp having a light fixture unit for emitting a light beam in the forward direction, a swivel mechanism for swinging the lighting fixture unit from side to side, and a drive controlling unit for controlling the drive of the swivel mechanism, wherein the drive controlling unit is arranged to calculate a driver viewing point angle from the vehicle velocity and a predetermined estimated horizontal G value during turning, wherein the predetermined estimated horizontal G value corresponds to a predetermined centripetal acceleration, and to set the angle corresponding to the driver viewing point angle as a target swivel angle over which the lighting fixture unit is swung, and further wherein the target swivel angle is calculated by adding a deviation of a highest light intensity position in a low beam light distribution pattern as an angle correction to the driver viewing point angle or by subtracting the angle correction from the driver viewing point angle.

* * * * *